United States Patent

Rogers

[11] Patent Number: 5,405,433
[45] Date of Patent: Apr. 11, 1995

[54] DIRECT CENTRATE/FILTRATE RETURN

[75] Inventor: Kevin J. Rogers, Wadsworth, Ohio

[73] Assignee: The Babcock & Wilcox Company, New Orleans, La.

[21] Appl. No.: 198,746

[22] Filed: Feb. 18, 1994

[51] Int. Cl.$^6$ .............................................. B01D 47/00
[52] U.S. Cl. ........................................ 95/187; 55/228; 55/229; 55/430; 95/195; 95/205; 95/235
[58] Field of Search .................... 55/228, 229, 430; 95/187, 195, 199, 200, 202, 205, 224, 235

[56] References Cited

U.S. PATENT DOCUMENTS

| | | | |
|---|---|---|---|
| 2,812,037 | 11/1957 | Stephan et al. | 95/205 |
| 2,815,091 | 12/1957 | Mas et al. | 95/195 |
| 2,980,523 | 4/1961 | Dille et al. | 95/205 |
| 3,327,455 | 6/1967 | Wertheimer | 55/228 |
| 3,733,788 | 5/1973 | Crowley | 55/228 |
| 4,047,891 | 9/1977 | Schuetz | 55/228 |
| 4,323,371 | 4/1982 | Ritvanen | 95/195 |
| 5,308,509 | 5/1994 | Bhat et al. | 95/195 |

FOREIGN PATENT DOCUMENTS

| | | | |
|---|---|---|---|
| 2444819 | 4/1976 | Germany | 95/195 |
| 51-45674 | 4/1976 | Japan | 95/205 |

*Primary Examiner*—Charles S. Bushey
*Attorney, Agent, or Firm*—Robert J. Edwards; Michael L. Hoelter

[57] ABSTRACT

A method and apparatus for recycling the bottoms product from an absorber tower back to the absorber tower. However, before the bottoms product is returned to the tower, the solid particles entrained therein are removed via one or more centrifuges closely coupled to the absorber tower. These centrifuges are located adjacent the tower and are elevated with respect to the tower such that their centrate can be directly returned or delivered back to the absorber tower via gravity.

8 Claims, 2 Drawing Sheets

DIRECT CENTRATE/FILTRATE RETURN

FIELD OF THE INVENTION

This invention pertains to a wet flue gas desulfurization (FGD) process and more particularly to a process wherein a portion of the bottoms product is diverted from the recirculation header and delivered to a centrifuge from which the cleaned liquid centrate is fed directly back to the tower via gravity.

BACKGROUND OF THE INVENTION

Wet flue gas desulfurization (FGD) absorber towers generally contain a liquid bottoms product that is high in suspended solids. Ideally this slurry is recycled back to the absorber for subsequent spraying onto the flue gas, but first the suspended solids therein are removed so that only clean process water is returned to the tower. In order to accomplish such solids removal, downstream dewatering equipment is required. This dewatering equipment often consists of one or more storage/surge tanks, pumps, hydroclones, thickeners, clarifiers, filters, and the like. Furthermore, this dewatering equipment produces the desired process water as well as concentrates the solid particles removed therefrom into a more manageable form for subsequent disposal.

Unfortunately, such equipment is costly to procure and it occupies much valuable real estate in the vicinity of the absorber tower. Additionally, the operation and maintenance of such equipment requires a considerable amount of both energy and manpower.

It is thus an object of this invention to eliminate or at least substantially reduce the need for such downstream dewatering equipment thereby conserving both money and energy. Another object of this invention is to provide a means of removing the suspended solids from the liquid bottoms product before returning the resulting clean process water back to the tower. Still another object of this invention is to accomplish such solids removal/process water recycle in a manner that requires little real estate thereby further enhancing the economy of this invention. Yet another object of this invention is to utilize existing recycle pumps for supplying the bottoms product to this invention thereby eliminating the need for separate supply pumps. Still another object of this invention is to return the process water back to the absorber tower via gravity thereby also eliminating the need for additional equipment. These and other object and advantages of this invention will be come obvious upon further investigation.

SUMMARY OF THE INVENTION

This absorber tower bottoms product recycle system incorporates a feed line take-off that is coupled to a bottoms product recirculation header. This feed line take-off diverts all, or a portion thereof, of a bottoms product that passes or travels through the recirculation header. Centrifuge means are coupled to the feed line take-off and are arranged to receive this diverted bottoms product. These centrifuge means separate the diverted bottoms product into a first clean centrate stream and a second solids stream. Conveyor means located underneath the centrifuge means receive the solids stream and transport it away from the centrifuge means. Centrate collection means, also located underneath the centrifuge means, receive the clean centrate stream and transports it directly back to the absorber tower.

DETAILED DESCRIPTION OF THE DRAWING

Figure 1:
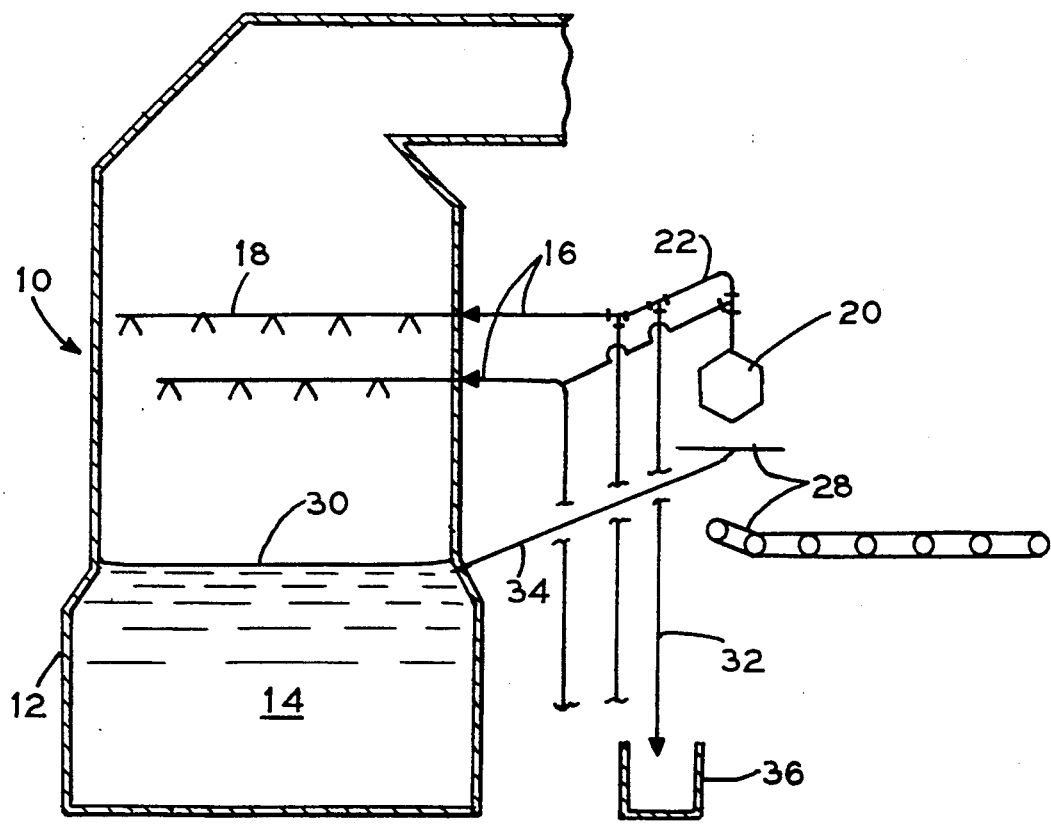
FIG. 1 is a pictorial side view of the absorber tower illustrating how one centrifuge of the invention (the others being removed for clarity) is coupled thereto.

Referring initially to FIG. 1, there is shown absorber tower 10 configured with lower absorber reaction tank 12. A liquid bottoms product 14 collects within tank 12 as a result of reactions occurring within and the blowdown from tank 10. This liquid bottoms product 14 typically consists of a mixture of water, unused reagent, spent particles, and other contaminants. As illustrated in the drawings, recirculation headers 16 deliver or recycle bottoms product 14 back to one or more spray levels 18 within tower 10 for subsequent spraying onto the flue gas so as to adequately consume any reagent contained in bottoms product 14.

Figure 3:
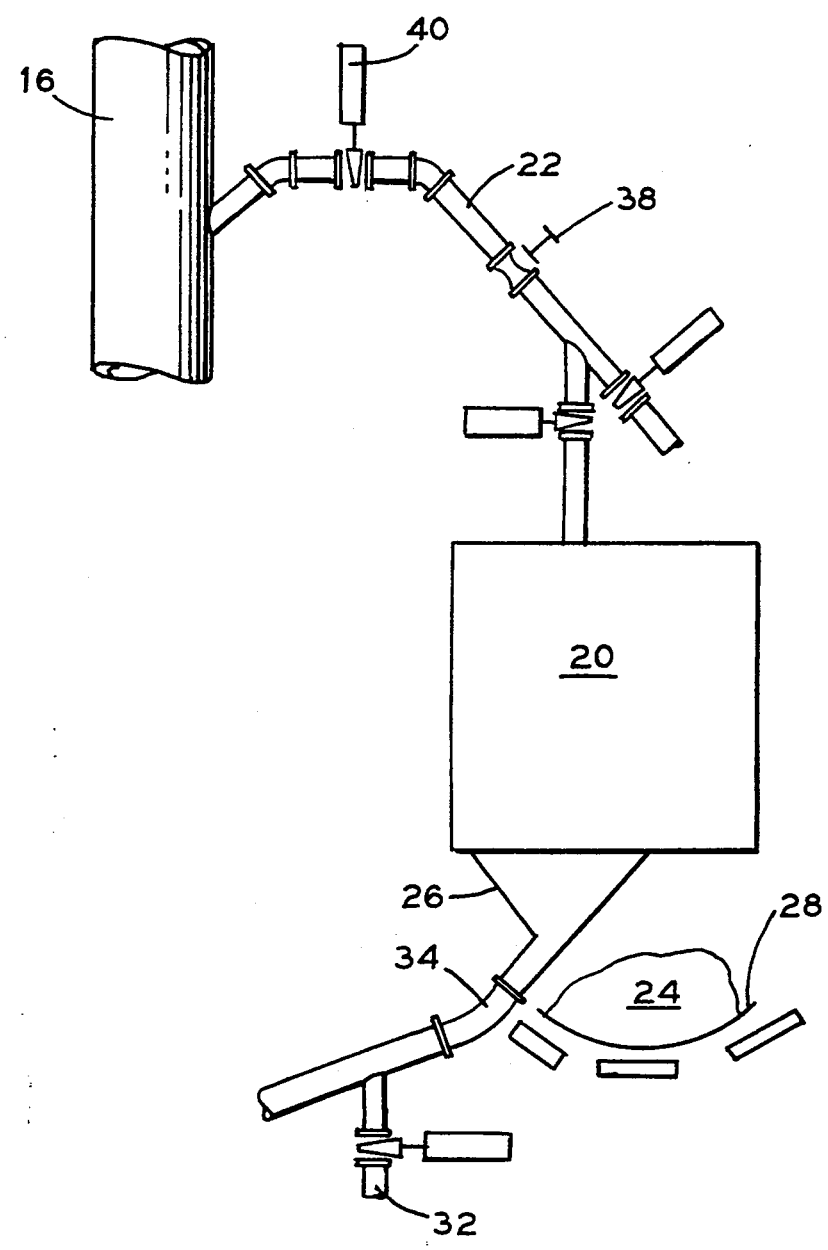
FIG. 3 is a pictorial enlarged view of the coupling of the centrifuge of FIG. 1 to the recycle header of the absorber tower.

In accordance with this invention, all or a portion of the recycled bottoms product 14 that is recirculated within headers 16 is instead delivered to a series of centrifuges 20. One possible centrifuge feed line 22 take-off design is illustrated in FIG. 3. Other designs which deliver liquid bottoms product 14 to one or more centrifuges 20 are also possible. By incorporating this invention, no additional feed pumps are needed since each centrifuge 20 is fed via the main recirculation pumps already recycling bottoms product 14 via recirculation headers 16. However, a series of additional pumps can be installed to specifically feed centrifuges 20 if so desired.

Within each centrifuge 20, the solid particles 24 that form a part of bottoms product 14 are removed and separated from the clean process water (or centrate) 26 therein. These solid particles 24 are discharged from these centrifuges 20 onto conveyor 28 (which is usually located underneath each centrifuge 20) for subsequent delivery elsewhere. The cleaned process water/centrate 26 collected by centrifuges 20 is directed back to tank 12 as shown. Usually this is accomplished via gravity so as to eliminate the need for additional motors and pumps. Ideally, this process water/centrate 26 is delivered or injected into tank 12 at a level equal to or below liquid level 30 within tank 12.

A centrate purge line 32 can be secured to this gravity feed line 34 if desired so as to deliver any excess centrate 26 to a purge water sump 36 or another location outside tower 10. The delivery of the centrate 26 through either purge line 32 or return line 34 can either be manually controlled or such control can be automated as desired. Thus, only the required amount of centrate 26 (i.e. all or a portion thereof) can be delivered where needed such as to reaction tank 12, to sump 36 for process water collection, or to purge line 32 for other removal from the system.

Conveyor 28 is illustrated as being of the three-roll belt type, but other configurations are equally likely. The purpose of conveyor 28 is to collect and transport solid particles 24 which are removed from liquid bottoms product 14 by centrifuges 20. Conveyor 28 can also assist in dewatering these solid particles 24 such as by permitting any liquid therein to pass through its belt. These dewatered solids 24 can then be discharged to either fall onto a storage pile near absorber 10 or these solids 24 can be conveyed to another location for subsequent disposal.

Figure 2:
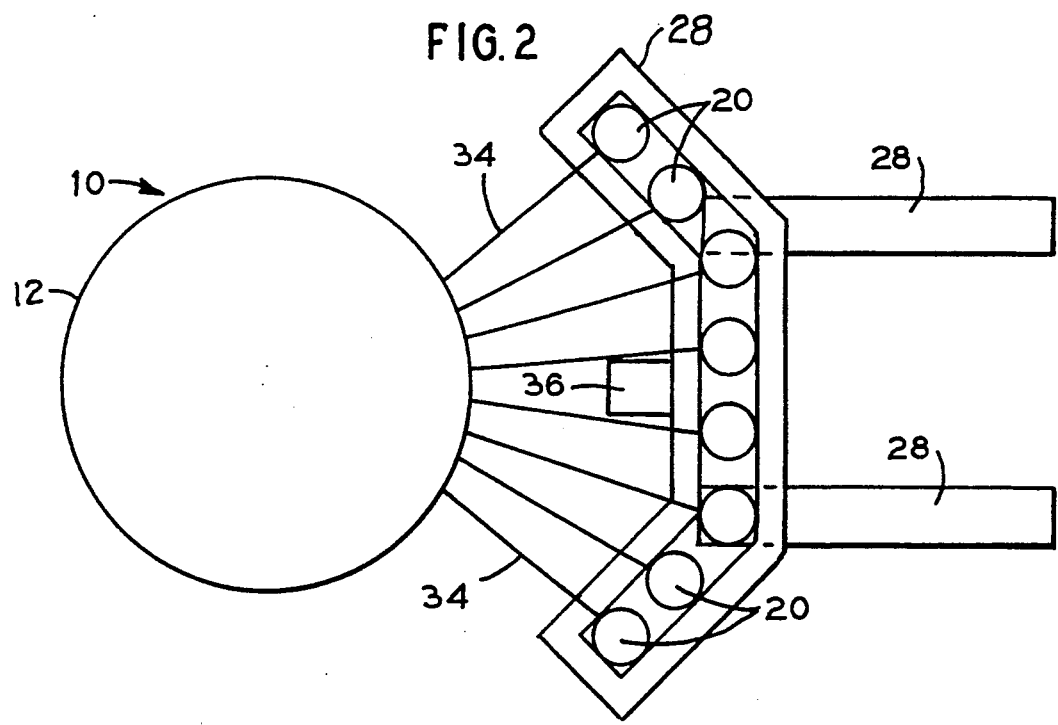
FIG. 2 is a pictorial plan view of that shown in FIG. 1 illustrating a plurality of centrifuges coupled to the absorber tower.

As shown in FIG. 2, a multitude of centrifuges 20 are arranged around tower 10 in an elevated position. This assists in the gravity feed of the cleaned centrate 26 from these centrifuges 20 back to tower 10. While FIG. 2 illustrates centrifuges 20 around only a portion of tower 10, they can also be arranged to fully surround tower 10. One important aspect of this invention is the elevation of these centrifuges 20 with respect to tower 10. In particular, centrifuges 20 are elevated above the operating liquid level 30 of reaction tank 12 and/or sump 36. This is to permit the return, by gravity, of centrate 26 directly back to tower 10 (and more particularly to reaction tank 12) without any further processing. Consequently, little additional real estate is required to implement this invention beyond the property already required for tower 10 since the need for additional pumps, motors, tanks, etc. are now eliminated. Furthermore, by arranging these centrifuges 20 integral with tower 10, or close coupling them with tower 10, even less space is required for operation and installation.

A series of valves 38 and controls 40 are located along each centrifuge feed line 22 as needed to both control the rate of flow of liquid bottoms product 14 to its respective centrifuge 20 and also to isolate a particular centrifuge 20 if such becomes necessary.

Furthermore, should the recovered centrate 26 be desired for other purposes, this centrate can be directed towards a process water sump or tank 36. This diversion from tower 10 can be accomplished during a discrete phase of the dewatering process when centrate 26 is the most solids-free. On the other hand, when centrifuge 20 is initially being fed or towards the end of a feed cycle when the centrifuge baskets are overflowing and centrate 26 is more heavily laden with solids, centrate 26 can be directed to sump 36 via purge line 32.

This invention thus provides a single-stage means of dewatering bottoms product 14 in a relatively compact format such that the centrate 26 from centrifuges 20 can be directly returned back to reaction tank 12 via gravity.

While the above invention is described with respect to one or more centrifuges 20, it should also be indicated that filters can be equally utilized in this process in place of centrifuges 20. Such filters would operate in the normal fashion, but their filtrate would be directly returned back to tower 10 rather than being delivered elsewhere, such as to downstream dewatering equipment. This invention is only described with respect to centrifuges 20 since it is believed that they are better suited for the influx of a stream that typically contains a lower concentration of solid matter, such as the liquid bottoms product 14 stream which is generally recirculated within tower 10.

What is claimed is:

1. A method of recycling an absorber tower bottoms product comprising the steps of:
  (a) recirculating a bottoms product in a bottoms product recirculation header having an uninterrupted flow path from a lower reaction tank which is integral to the absorber tower to one or more elevated spray levels within the absorber tower;
  (b) coupling a feed line take-off to said bottoms product recirculation header, said feed line take-off diverting all or a portion thereof of said bottoms product passing through said bottoms product recirculation header from said lower reaction tank;
  (c) coupling centrifuge means to said feed line take-off and arranging said centrifuge means for the receipt of said diverted bottoms product from said lower reaction tank, said centrifuge means being elevated above the level of said bottoms product in said reaction tank and said centrifuge means separating said diverted bottoms product into a centrate stream and a solids stream;
  (d) installing conveyor means underneath said centrifuge means for receiving said solids stream from said centrifuge means and for transporting said solids stream away from said centrifuge means; and,
  (e) locating centrate collection means underneath said centrifuge means for receiving said centrate stream from said centrifuge means and for transporting said centrate stream directly back to said reaction tank via gravity at an elevation at or below the level of said bottoms product in said reaction tank.

2. The method as set forth in claim 1 further comprising the step of diverting all or a portion of said centrate stream from said reaction tank via a centrate purge line.

3. The method as set forth in claim 2 further comprising the step of incorporating a plurality of centrifuges in said centrifuge means with each said centrifuge being fed via one or more said feed line take-offs coupled to a said recirculation header.

4. The method as set forth in claim 3 further comprising the step of controlling the feed of said bottoms product to said centrifuge means and controlling the delivery of said centrate stream to said recirculation tank via control means.

5. An absorber tower bottoms product recycle system comprising:
  (a) a bottoms product recirculation header having an uninterrupted flow path recirculating a bottoms product from a lower reaction tank which is integral to the absorber tower to one or more elevated spray levels within the absorber tower;
  (b) a feed line take-off coupled to said bottoms product recirculation header, said feed line take-off diverting all or a portion thereof of said bottoms product passing through said bottoms product recirculation header from said lower reaction tank;
  (c) centrifuge means coupled to said feed line take-off for receiving said diverted bottoms product from said lower reaction tank, said centrifuge means being elevated above the level of said bottoms product in said reaction tank and said centrifuge means separating said diverted bottoms product into a centrate stream and a solids stream;
  (d) conveyor means located underneath said centrifuge means for receiving said solids stream and transporting said solids stream away from said centrifuge means; and,
  (e) centrate collection means underneath said centrifuge means for receiving said centrate stream and transporting said centrate stream directly back to said reaction tank via gravity at an elevation at or below the level of said bottoms product in said reaction tank.

6. The recycle system as set forth in claim 5 further comprising a centrate purge line for diverting all or a portion of said centrate stream from said reaction tank.

7. The recycle system as set forth in claim 6 wherein said centrifuge means comprise a plurality of centrifuges each fed via one or more said feed line take-offs coupled to a said recirculation header.

8. The recycle system as set forth in claim 7 further comprising control means for controlling the feed of said bottoms product to said centrifuge means and for controlling the delivery of said centrate stream to said recirculation tank.

* * * * *